(12) United States Patent
Annan et al.

(10) Patent No.: US 9,125,145 B1
(45) Date of Patent: Sep. 1, 2015

(54) MOBILE DEVICE CENTERED COMMUNICATION ROUTING MODULE

(71) Applicant: Sprint Communications Company L.P., Overland Park, KS (US)

(72) Inventors: Brandon C. Annan, Westwood Hills, KS (US); John E. Belser, Olathe, KS (US); Dale S. Schempp, Lenexa, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 222 days.

(21) Appl. No.: 13/769,271

(22) Filed: Feb. 15, 2013

(51) Int. Cl.
*H04W 48/18* (2009.01)
*H04W 8/26* (2009.01)
*H04M 15/00* (2006.01)

(52) U.S. Cl.
CPC ............. *H04W 48/18* (2013.01); *H04W 8/26* (2013.01); *H04M 15/8038* (2013.01)

(58) Field of Classification Search
CPC .............. H04M 3/42059; H04M 3/42306; H04M 3/44; H04M 3/4933; H04M 3/5183; H04W 8/12; H04T 2001/207
USPC .......................................... 455/411, 436–444
See application file for complete search history.

(56) References Cited

U.S. PATENT DOCUMENTS

| | | | |
|---|---|---|---|
| 8,509,746 B1* | 8/2013 | Breau et al. ................. | 455/414.1 |
| 2004/0152445 A1* | 8/2004 | Muller .......................... | 455/410 |
| 2006/0143058 A1 | 6/2006 | Brunet et al. | |
| 2008/0200143 A1* | 8/2008 | Qiu et al. .................... | 455/404.2 |
| 2010/0105369 A1 | 4/2010 | DiPrima et al. | |

* cited by examiner

Primary Examiner — Charles Appiah
Assistant Examiner — Edward Zhang (57) ABSTRACT

A mobile communications routing device. The device comprises an interface configured to receive an input, wherein the input is correlated to a customer service center telephone number, a memory, a processor, and an application stored in the memory. When executed by the processor, the application determines a parameter of the device in response to the input, identifies a mobile service provider correlated with the parameter, verifies the parameter associated mobile service provider, and routes a communication from the mobile device to the customer service center of the mobile service provider correlated with the device parameter.

16 Claims, 7 Drawing Sheets

MOBILE DEVICE CENTERED COMMUNICATION ROUTING MODULE

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile communication devices are used to originate voice calls and to access data communications such as receiving and sending email, surfing the Internet, and interacting with social networks, as well as other accesses. Users may frequently upgrade their mobile communication devices to gain the benefits of the advancing state-of-the-art in personal communication devices. Users may change from one service brand to another to gain the benefits of pricing differentials and/or to obtain differentiated services available from one provider but not from other providers. Number portability may promote these user behaviors as the user's phone number may remain unchanged from device to device and from service brand to service brand.

SUMMARY

In an embodiment, a telecommunications routing device is disclosed. The device comprises a processor, a memory having an application stored there that is executable by the processor and an interface configured to receive an input from a user. The input is a command to access a correlated one of a plurality of telecommunications networks. When executed by the processor the application interrogates a device parameter in response to the input, accesses and queries a telecommunications network correlated with the device parameter, identifies the telecommunications network access authorization correlated with the device parameter verifies the device parameter in response to the correlated communications network parameters and access authorization; and routes a communication from a mobile communications device to a provider correlated with the device parameters.

In an embodiment, a method of routing telecommunications to the correct service provider is disclosed. The method comprises receiving an input on a portable telecommunications device, wherein the input is correlated to a first service provider, interrogating a parameter of the telecommunications device in response to the input, identifying a second service provider according to the parameter, querying the telecommunications network correlated with the second service provider, verifying the device parameter with the second provider's network parameters and access authorization, and routing a communication from the portable telecommunications device to the second provider.

In an embodiment, a method of reprovisioning a mobile device is disclosed. The method comprises receiving an input on a mobile device, wherein the input is a command to access a communications network, accessing parameters of the mobile device related to the communications network, querying the communications network for the provider parameters, interrogating the mobile device parameters with the provider parameters, caching the mobile device parameters and installing the provider parameters as the device parameters.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

A large proportion of telecommunications devices are configured to permit users to contact the customer support services from a contracted service provider, or any software or hardware providers based on the input of a customer calling code or shortcut. The calling code directs the customer to a customer service center in order to provide responsive attention to that customer's use of the device and access via the service provided. However, users of telecommunications devices are increasingly demanding device portability across multiple service providers. Among those service providers are discount carriers or reduced rate service providers that operate as a wholly owned subsidiary or subcontract their network services to others within the industry. As a result, telecommunications devices are manufactured and configured generically such that the device is not specifically tied to a particular service provider. The portability of devices among the service providers may degrade the functionality of calling codes or shortcuts and lead to frequent misdialing and misdirection of customer support calls.

Broadly, in response to consumer demand for unlocked or portable mobile devices, hardware manufacturers are reluctant to lock their devices into a single service provider or carrier. As used herein 'consumers' may include individuals, families, corporate entities, or any other purchaser of mobile devices for use on telecommunications networks. Likewise, the 'users' are the consumers or individuals in possession of a mobile device and are utilizing the device for mobile telecommunications on a mobile device network. Typically, mobile telecommunication consumers search for the best value in a mobile telecommunications network, including voice and data service with their preferred devices, prior to agreeing to a contract with a service provider. The consumer-preferred devices may be available or compatible with multiple service providers, thereby improving the flexibility in choosing a provider. From a service provider's standpoint, the increased portability of devices among service providers represents increased competition for the consumer's business. Improving customer service and positive experiences is important for retaining consumers to a service provider. As such, service providers may seek means to improve the experience for their consumers and minimize negative experiences.

In order to provide their consumers improved ease of use and customer service, many service providers provide vertical service codes (VSC). The vertical service codes (VSC) are shortened or truncated user inputs that function to route the user's communications to the service provider's customer service center. Generally, the customer service centers include for example, automated systems or personal help desks that provide the user relevant information, invoicing, payment, renewal, and other options related to their accounts and usage with a contracted service provider. Informally the vertical service codes (VSC) may be referred to as quick-codes, star-codes, customer-codes, user-coders, and the like. Hereinafter these user inputs will be referred to as a "shortcut" that permits the user to contact their provider's customer service without having to know or memorize a 10-digit or a 7-digit telephone number. Providing the user a mobile device and a network with these shortcuts represents a method of improving user experiences.

However, a shortcut may be provider or device specific, such that placing a call in response to the shortcut requires the compatible network and device that recognize the shortcut in order to place the call to customer service. Additionally, users are slow to relearn or adopt the shortcuts of a new provider after making a switch between mobile service providers. Thus, the user's attempted utilization of a former service provider's shortcut on a new or recently contracted service provider's mobile network is typically rejected, creating a possible user negative experience that the customer service provider seeks to avoid.

Additionally, due to incomplete mobile network coverage in certain geographical areas, a mobile device may be utilized on one or more other service providers' networks. This condition is sometimes referred to as "roaming" in the mobile telecommunications industry. Roaming is permitted under certain agreements between service providers and may result in increased costs for the users. Additionally, the shortcuts for the original service provider may not be recognized by the roaming network service provider, and as a result the user is unable to contact their service provider. This may also result in a negative user experience.

Also economic pressures have provided incentive for niche or small market-share service providers to subcontract the capital expenses associated with building, maintaining, and upgrading a mobile device telecommunications network. These niche market service providers may be considered Mobile Virtual Network Operators (MVNO). The mobile virtual network operators (MVNO) lease or subcontract operation and ownership of the infrastructure from a larger entity. Alternatively, mobile virtual network operators (MVNO) may be brands associated with or operated as subsidiaries of a larger telecommunications entity that provides niche market users with an enhanced experience at lower costs or at a higher value. However, to provide direct customer service to their contracted users, the mobile virtual network operators (MVNO) maintain and operate their own customer service centers. The cooperation of the two service providers also creates the potential for a shortcut to at least temporarily fail network recognition, particularly under the roaming conditions described previously. This is another preventable negative user experience Accordingly, providing a user with a device centralized customer service communication module represents a means to avoid the aforementioned circumstances. Thus, providing users a device that has the module loaded and operable is beneficial for retaining current contracted consumers as well as attracting future consumers. Further, minimizing resources deployed to redirect and address consumer issues provides another means for increasing profitability of a subsidiary brand, or a contract with a mobile virtual network operator (MVNO).

The present disclosure relates to providing the consumer a means to connect to their customer service center for configuring a generic mobile device or an installable application to recognize an incorrect shortcut and self-correct. For example, the device has stored the relevant information in order to redirect a consumer's telecommunication needs. In some instances, the device utilizes network accessible parameters in order to identify and redirect the consumer's telecommunication needs. In certain instances, a device is able to reprovision or reconfigure itself, to conform to a consumer's choice of telecommunications networks. Thus, the present disclosure relates to a mobile device communication routing module and a method of routing communications to the appropriate service provider customer service center in response to an erroneous user input.

For example, the device may be configured to use any telecommunications protocol for mobile devices, without limitation. Representative exemplary communications protocols may include a code division multiple access (CDMA) wireless communication protocol, a global system for mobile communication (GSM) wireless communication protocol, a long-term evolution (LTE) wireless communication protocol, or a world-wide interoperability for microwave access (WiMAX) wireless communication protocol. Further, the device may be configured to identify the user and the device by any protocol. For example a network access identifier (NAI), a home network identity (HNI), an international mobile station equipment identity (IMEI), an international mobile subscriber identity (IMSI), a mobile subscriber isdn number (MSISDN), a mobile station roaming number (MSRN), a location area identity (LAI), a tracking area identity (TAI) local mobile subscriber identity (LMSI), cell identifier (CI), packet data network identity (PDNI), or any other temporary or permanent means for identifying the user, the device, the user's service provider, and the user's account or subscription therewith, without limitation. Acknowledging there are many protocols for identifying a mobile device user on a telecommunications network, for brevity this information is generically referred to herein as the device operator identifier (DOI).

For example, a mobile device communication routing module is configured to receive an input and route a communication according to a parameter stored on the phone. The parameter on the phone may comprise the device operator identifier (DOI) or network access identifier (NAI) temporarily or permanently installed on the device, another communications protocol, and the service provider's customer service phone number. The routing module is configured to access the parameter and route the communication to the appropriate customer service phone number. In some configurations, the routing module is configured to recognize that an input is intended for a service provider that the parameter does not support and route the communication to the appropriate customer service center. For example, the routing module may be configured to identify any of short code #1, short code #2, short code #3, and short code #4 as attempts to reach a customer service center, for example a first customer service center associated with a first service brand, a second customer care center associated with a second service brand, a third customer care center associated with a third service brand, and a fourth customer care center associated with a fourth service brand respectively.

In other configurations, the routing module is configured to recognize that the telecommunications network the user is attempting to connect with does not support the user input shortcut, and route the communication to the correct customer service center. Also, the routing module is configured to verify the parameter's validity with the telecommunications network and the appropriate receiver in some configurations. In some configurations, the routing module is configured to cache or store the parameter for improved access at a later time. In additional configurations, the routing module is configured to replace the cached parameter with a current version upon receiving instructions from a network.

For example, a mobile device centered customer care call routing module is configured to receive an input and route a mobile telephone call according to a parameter stored on the device. The routing module is configured to verify the parameter according to mobile service provider and route the user's mobile telephone call to the appropriate mobile service provider's customer care call center. Further, the routing module may be configured to recognize that a user input is indicative of an attempted telephone call to a customer service call center correlated with a mobile service provider that the parameter does not support. Having inferred the user's intention, the routing module directs the mobile telephone call to the appropriate supported customer call center. In some configurations, the routing module is configured to recognize that the telecommunications network the mobile device is attempting to direct a mobile telephone call on does not recognize or support the shortcut that was input by the user. The routing module then redirects the telephone call to the appropriate provider customer care call center.

Figure 1:
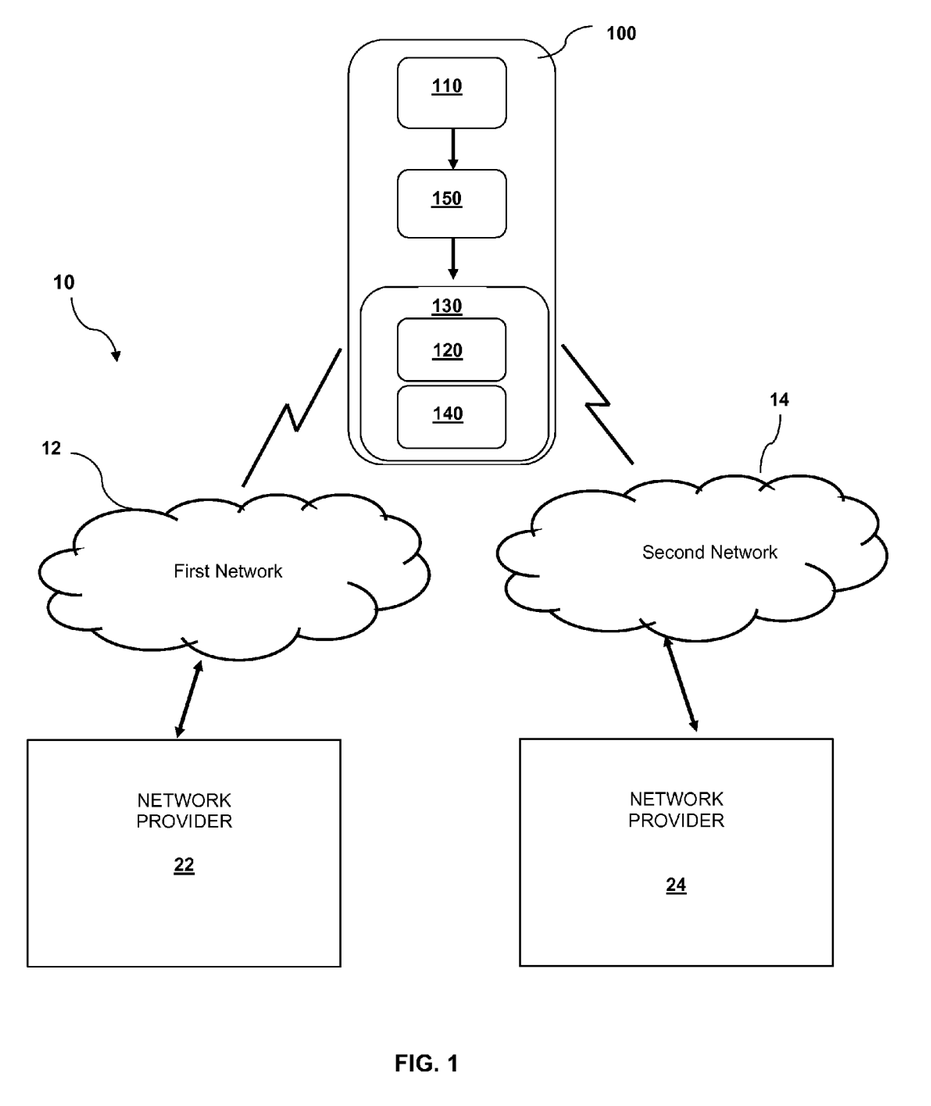
FIG. 1 illustrates an exemplary telecommunications customer care call routing system.

Referring now to FIG. 1, there is illustrated a mobile telecommunications system 10 according to the present disclosure. The system comprises a mobile device 100 that is configured to selectively communicate with at least one of a first network 12 and a second network 14. A mobile device 100 may be a mobile phone, a personal digital assistant (PDA), a media player, or other mobile communication device without limitation. Mobile device 100 comprises user interface 110, processor 150, and a storage medium 130. The storage medium 130 comprises a non-transitory computer readable storage medium. The storage medium 130 stores a routing module 120 and a parameter 140.

In embodiments, the first network 12 and the second network 14 comprise any telecommunications networks configured for mobile device 100 access. Generally, a first network provider 22 operates first network 12 and a second network provider 24 operates second network 14. The second network provider 24 may be a brand or subsidiary of the first network provider 22. In instances, each network provider 22, 24 may be considered a customer service center or operating a customer service center.

In embodiments, in response to an input, for example via the user interface 110, the processor 150 executes instructions in the routing module 120 on the storage medium 130. The processor 150 also accesses the parameter 140 in conjunction with the routing module 120 to utilize the parameter 140 in communication with at least one mobile telecommunications network 12, 14 from a network provider 22, 24.

Figure 2:
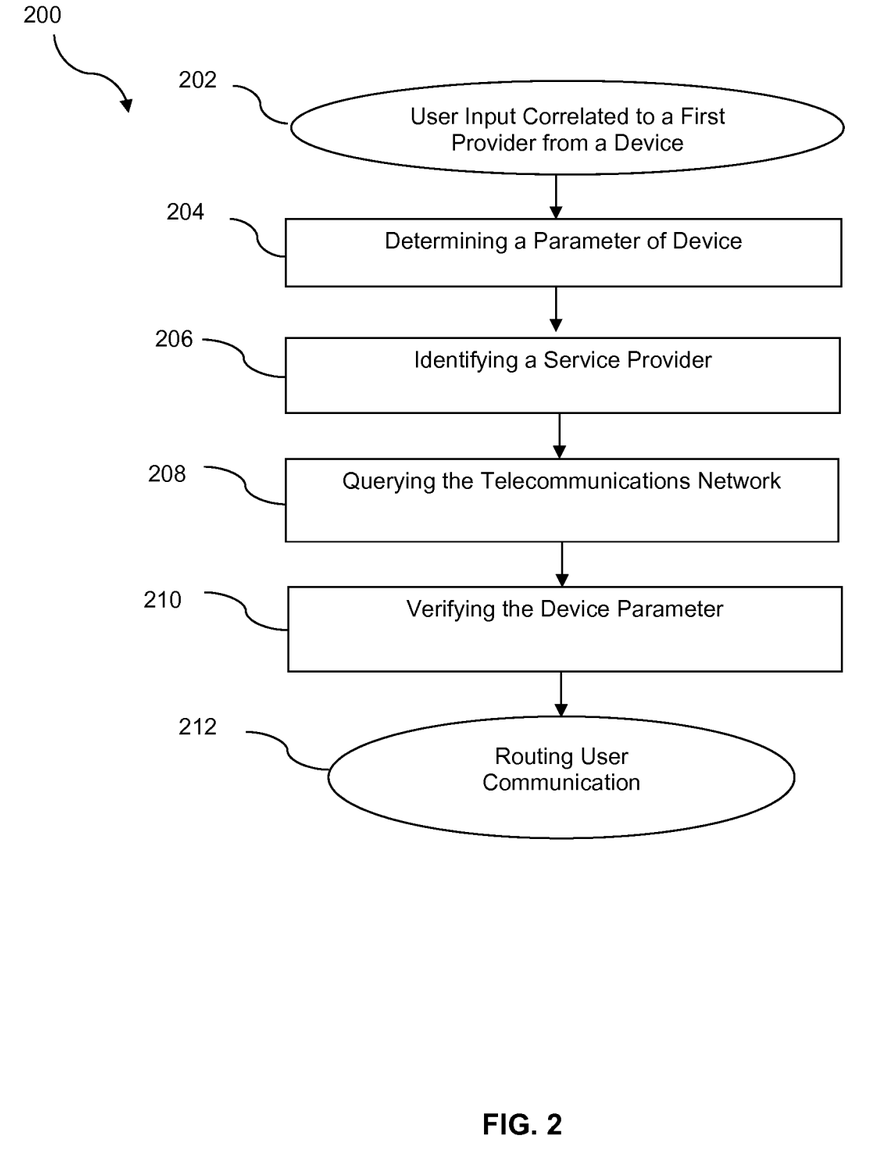
FIG. 2 illustrates an exemplary telecommunications customer care call routing method.

Referring now to FIG. 2, there is illustrated a method for routing a telecommunication from a mobile device to a corresponding service provider. Generally, the routing method 200 relates to the sequential or simultaneous operation of the routing module described previously. The routing method 200 comprises receiving a user input 202, determining a parameter of the telecommunications device 204, identifying a second service provider 206, querying the telecommunications network 208, verifying the device parameter 210, and routing the user communication 212. In some configurations, the routing the user communication 212 further comprises re-directing the user to another service provider. Further, the routing method 200 is generally used for user requested remediation of a customer service issue with a telecommunications device or a telecommunications network.

In the routing method 200, receiving the user input 202 generally comprises receiving an alphanumeric input via a telecommunications device interface, for example a touch screen or a keypad. Receiving the input 202 comprises receiving a phone number for calling another person or a website uniform resource locator (URL). In some instances, receiving the user input 202 comprises receiving a shortcut such as but not limited to a vertical service code (VSC) for contacting the provider's customer service. Further, receiving the user input 202 comprises identifying that the input is a shortcut, for example a "*2" input, as opposed to another routing command such as a phone number, uniform resource locator (URL), or in some instances, accidental or erroneous inputs.

Exemplary shortcuts have been discussed previously, and such shortcuts may include any alphanumeric or symbol containing sequence. Generally, receiving a shortcut 202 may be used for accessing information from a telecommunications service provider. In some instances, the shortcut is determined to be for contacting a first telecommunications service provider directly through a customer service or customer care call center. In certain instances, receiving the user input 202 that is indicative of a shortcut may comprise accessing the telecommunications device memory.

Determining a parameter of the mobile telecommunications device 204 comprises accessing the device memory, locating a parameter, and verifying that the parameter corresponds to a service provider. Determining a parameter of the telecommunications device 204 comprises locating the device operator identifier (DOI) or network access identifier (NAI) stored on the device memory and interrogating the device operator identifier (DOI) or network access identifier (NAI) in view of the shortcut, the factory device settings, and the mobile telecommunications network. The parameter is verified against the shortcut that is related to a first service provider utilized by the user, a listing of shortcuts for various telecommunications service providers, and the device's factory setting or factory identified telecommunications service provider. In some instances, determining the parameter of the device 204 comprises, identifying that the user input was a shortcut that was not related to the parameter stored on the phone and that the user's input was erroneous.

Identifying a second service provider 206 comprises identifying that the shortcut utilized by the user is associated with and utilized for contacting a first service provider. Further, identifying a second service provider 206 comprises identifying that the parameter including the device operator identifier (DOI) or network access identifier (NAI) stored on the device memory are utilized for contacting a different mobile telecommunications network than the user's shortcut. For example, the parameter is associated with accessing a second service provider's mobile telecommunication network. Thus, identifying a second service provider 206 comprises identifying the mobile telecommunications network and the protocols utilized therein that are unrelated to the user's input.

Querying the telecommunications network 208 comprises accessing the second service provider mobile network utilizing the parameter stored on the mobile device 100. In instances, querying the telecommunications network 208 comprises accessing the network to transmit information and direct the call to a customer service center. Further, querying the network 208 may further comprise receiving data and information regarding the network protocols for storing in the memory of the mobile device. In certain instances, querying the network 208 includes establishing a mobile data transmission between the mobile device and the second service provider during the call. In some instances, querying the telecommunications network 208 includes storing or reconfiguring the device such that the incorrect input is associated with the second service provider and correlated to the parameter. In other instances, querying the telecommunications network 208 comprises notifying or prompting the user for permission to change the association with the shortcut or alter the configuration of the device in order to more efficiently access the telecommunications network associated with the parameter and the device.

In embodiments, verifying the device parameter 210 comprises verifying that the parameter contains the device operator identifier (DOI) or the network access identifier (NAI) according to the most recent mobile communication network requirements. In instances, verifying the device parameter 210 comprises checking for updates to the parameters that the versions accessed, downloaded, and installed during some operations related to querying the network 208. In some instances, verifying the device parameter 210 is simultaneous with the subsequent step of routing the user communication 212.

Alternatively, verifying the device parameter 210 may be utilized to verify that the mobile device is being used in compliance with a device manufacturer's policies or a service provider's contract. As such, verifying the device parameter 210 may comprise verifying that the data correlated to the user, the provider, the mobile telecommunications network, and the telephone number associated with the device has not been altered by unauthorized means, for example "jail broken" or "un-locked." The data may include the properties related to the parameters needed to access and utilize the network such as the device operating system software, the version or release of the device software, along with any encryption or security protocols, transmission/reception protocols, and the version or release of the software supporting those protocols. In certain instances, verifying the device parameter 210 comprises verifying that the parameter correlates to and identifies the device and user on and according to the protocols of the service provider.

Routing the user communication 212 comprises routing the user shortcut according to the parameter on the associated telecommunications network, for example the second service provider's telecommunications network. Generally, routing the user communication 212 comprises directing a communication to a customer service or customer care destination, including a customer call center or a website. Routing the user communication 212 may comprise routing the user telecommunication to a third party or a subcontracted customer call center for example a technical support call center or a billing and collections call center without limitation.

In alternate embodiments of the method 200, certain steps may be excluded or combined such that they are simultaneously executed. For example, in an alternate embodiment of the method 200, the steps of determining a parameter 204 and identifying a second service provider 206 may occur simultaneously or nearly simultaneously. For example, locating the device operator identifier (DOI) or network access identifier (NAI) when determining a parameter 204 may immediately identify the second service provider 206. Further, as discussed hereinabove, after querying the second telecommunications network 208 in a previous execution of the disclosed method 200, the parameter may be reconfigured to such that it is already correlated with the user input. Thus, determining the parameter 204 already identifies the service provider 206.

In further alternate embodiments, the method 200 may be executed such that the steps of querying the telecommunications network 208, verifying the device parameter 210, and routing the user communication 212 occur substantially simultaneously. As described herein during a previous execution of the method 200, the parameter may be updated and cached for example during querying the mobile telecommunications network 208. Additional steps of querying the telecommunications network 208 and verifying the device parameter 210 are unnecessary, unless the user communication cannot be routed to the appropriate receiver.

Figure 3:
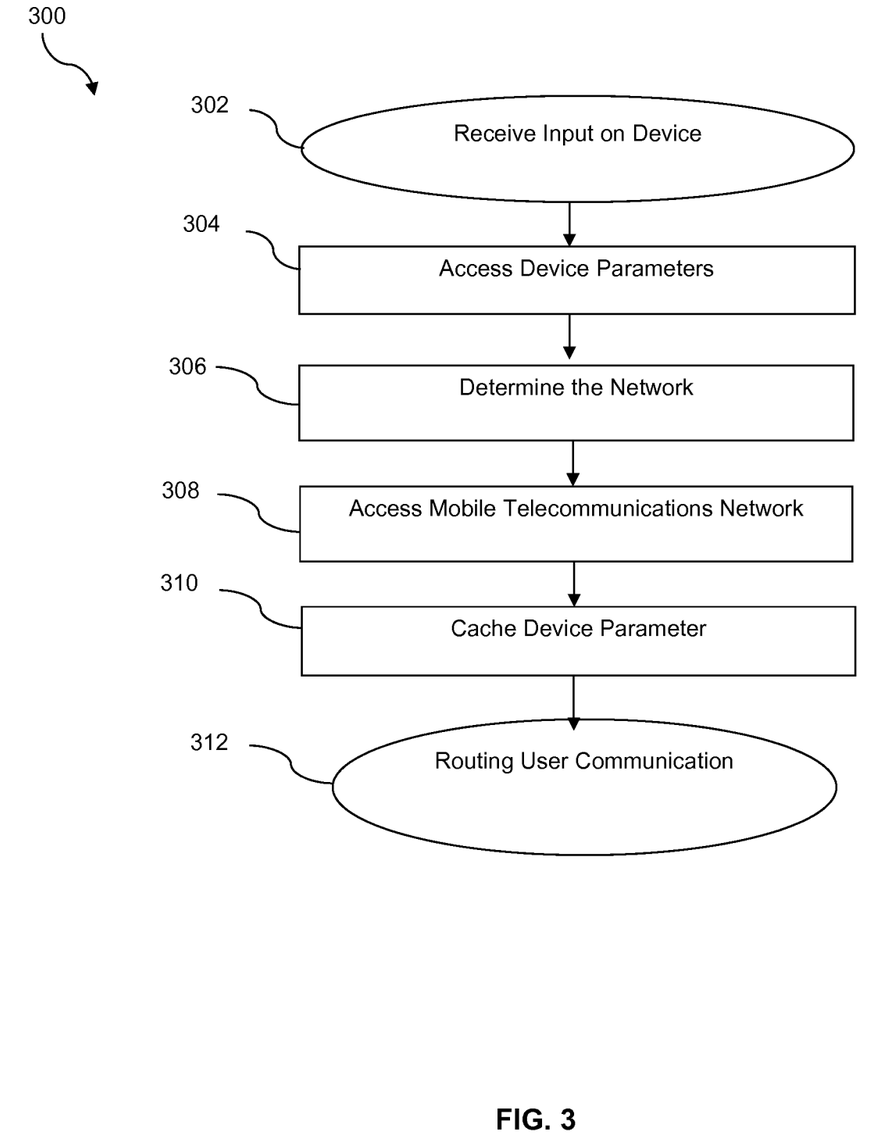
FIG. 3 illustrates an exemplary mobile device reprovisioning method.

Referring now to FIG. 3 there is illustrated a method for reprovisioning a mobile device 300. Generally, reprovisioning the mobile device 300 comprises changing a parameter that is stored on the memory in response to an input. Reprovisioning the mobile device 300 comprises a series of steps that are executed on the mobile device in order to access a mobile telecommunications network. The parameter on the mobile device 100 may comprise the device operator identifier (DOI) or the network access identifier (NAI) and the associations of various shortcuts thereto.

In embodiments, reprovisioning the mobile device 300 includes changing a parameter to correspond with a mobile telecommunications network such that an incorrect, unassociated, or misdialed shortcut is correctly routed to the mobile telecommunications network with which the user has associated the device. For example, the mobile device 100 is configured without a parameter installed, because the mobile device 100 is new or has undergone a reset to default or factory conditions. Alternatively, the mobile device 100 is being reconfigured to access a new mobile telecommunications network provided by a new or second mobile telecommunications company. In certain instances of this embodiment, the previous parameter may be stored or cached on the memory for future use.

Further, the steps for reprovisioning the device 300 may be due to a user input or due to a signal received from a telecommunications network or a service provider. Therefore, the overall method of reprovisioning a mobile device 300 includes the steps of receiving an input on the device 302, accessing the parameters on device memory 304, determining the network associated with the parameters 306, accessing a mobile telecommunications network 308, caching the mobile device parameters from the network 310 and routing a user communication 312.

In the method of reprovisioning a device 300, receiving an input on a mobile device 302 comprises a user input. An input comprises a user dialing shortcut, for example to call a customer service center, a telephone number or website uniform resource locator (URL). Exemplary shortcuts may include any alphanumeric or symbol containing sequence as discussed previously. Alternatively, receiving an input 302 may include activating the mobile device for example powering the device up or inputting an activation code. Still further, receiving an input may comprise being used for accessing information from a service provider stored on the mobile device 100. Generally, receiving an input on the device 302 comprises attempting to access a mobile telecommunications network or place a mobile telephone call. Further, receiving the input on the device 302 may comprise receiving an input that it is indicative of calling a service provider's customer care center.

Accessing the device parameters 304 comprises accessing the memory of the device. More specifically, accessing the device parameters 304 comprises identifying if there are parameters installed on the device memory and determining if the device parameters are correlated with the input. The parameters on the mobile device may comprise the device operator identifier (DOI) or the network access identifier (NAI), as described herein. Further, the parameters on the mobile device 100 may be correlated with an input that was not provided. Thus, the step of accessing the device parameters 304 comprises accessing the device memory, locating a parameter, and verifying the parameter is correlated to the input. In further instances, accessing the device parameters 304 includes accessing any cached or historic versions of the parameters. Without limitation, the cached parameters of the mobile device 304 may be considered back-ups from which a reset, or default device protocol is returned. In some cases, the cache may include a listing of inputs or shortcuts. In some instances, accessing the parameter of the device 304 comprises, identifying that the input was a shortcut for contacting a service provider or attempting to transmit a telecommunication.

Determining the network 306 comprises identifying the mobile telecommunications service provider correlated with a parameter on the device. In certain instances, determining the network 306 comprises identifying that the input was incorrect or otherwise unassociated with the service provider. Thus, determining the network 306 includes identifying the service provider and parameter association. Further, determining the network 306 may include altering the correlation between the input, the parameter, and the service provider, such that the input is newly correlated to the service provider. In some instances, determining the network 306 may comprise loading, installing, or otherwise configuring inactive or cached parameters on the device.

The step of accessing the mobile telecommunications network 308 comprises verifying that the parameter installed on the mobile device 100 contains the data needed to utilize the network and route the telecommunication. Generally, accessing the mobile telecommunications network 308 comprises a device mediated update or refresh of the parameters and any software on the device. In some instances, the accessing the mobile telecommunications network 308 comprises retrieving or downloading updated parameters that correlate to the contracted service provider. Additionally, accessing the mobile telecommunications network 308 may comprise additional updating steps related to the device operating system software, any encryption or security protocols, transmission/reception protocols, and the version or release of the software supporting those protocols. Further, accessing the mobile telecommunications network may further include identifying a second service provider in order to download new, updated, or different parameters therefrom.

The method of reprovisioning a mobile device 300 comprises caching the device parameter 310. Caching the device parameter 310 comprises associating the input with the parameter and the service provider. Further, caching the device parameter 310 comprises associating the input with a customer care center or a customer service center. In certain instances, caching the parameter 310 comprises redirecting an incorrect input to a customer service center automatically. Also, caching the device parameter 310 on a mobile device improves the speed at which the parameter may be accessed in response to an input at a future date. Alternatively, caching the device parameter 310 creates an inventory or a log of the changes in the parameters of the device. The inventory or log may be service provider accessible to verify that the mobile device is being utilized in compliance with their user agreement.

The method of reprovisioning a mobile device 300 comprises routing a user communication 312. Generally, after the parameter has been cached, the user's next telecommunication is directed to a customer care or customer service center. By routing the user communication 312 to the customer service center, a service provider may update or activate the user's account and contract. Further, routing the user communication 312 to the customer care center permits the service provider to inform the user of any changes to the operation of their device or changes in their account. Finally, routing a user communication 312 permits the customer service center to send information to the device for more generalized access and usage of a telecommunications network.

Figure 4:
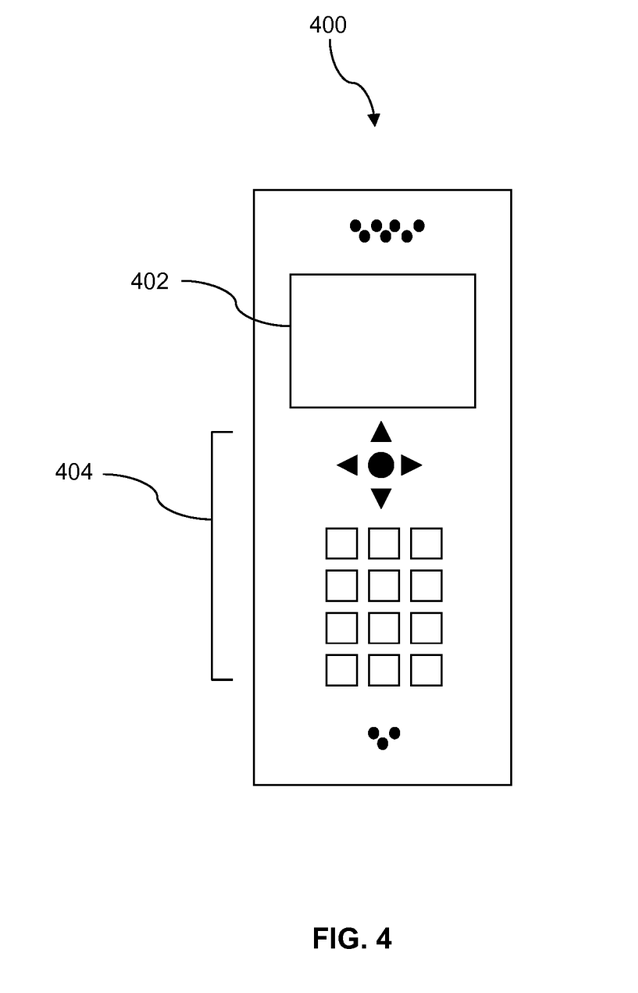
FIG. 4 is an illustration of a mobile communication device according to an embodiment of the disclosure.

FIG. 4 shows a wireless communications system including the mobile device 400. FIG. 4 depicts the mobile device 400, which is operable for implementing aspects of the present disclosure, but the present disclosure should not be limited to these implementations. Though illustrated as a mobile phone, the mobile device 400 may take various forms including a wireless handset, a pager, a personal digital assistant (PDA), a gaming device, or a media player. The mobile device 400 includes a display 402 and a touch-sensitive surface and/or keys 404 for input by a user. The mobile device 400 may present options for the user to select, controls for the user to actuate, and/or cursors or other indicators for the user to direct. The mobile device 400 may further accept data entry from the user, including numbers to dial or various parameter values for configuring the operation of the handset. The mobile device 400 may further execute one or more software or firmware applications in response to user commands. These applications may configure the mobile device 400 to perform various customized functions in response to user interaction. Additionally, the mobile device 400 may be programmed and/or configured over-the-air, for example from a wireless base station, a wireless access point, or a peer mobile device 400. The mobile device 400 may execute a web browser application which enables the display 402 to show a web page. The web page may be obtained via wireless communications with a base transceiver station, a wireless network access node, a peer mobile device 400 or any other wireless communication network or system.

Figure 5:
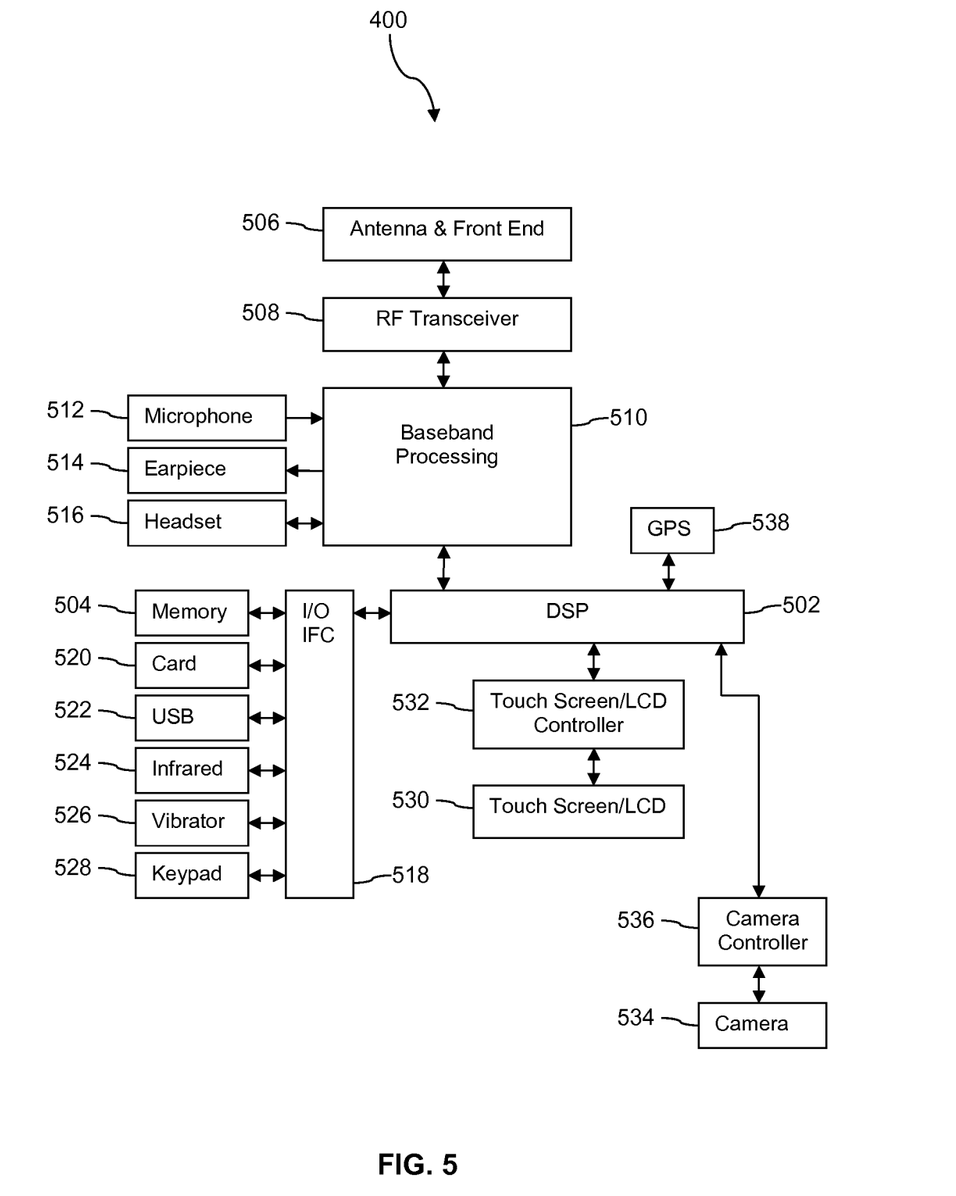
FIG. 5 is a block diagram of a mobile communication device according to an embodiment of the disclosure.

FIG. 5 shows a block diagram of the mobile device 400. While a variety of known components of handsets are depicted, in an embodiment a subset of the listed components and/or additional components not listed may be included in the mobile device 400. The mobile device 400 includes a digital signal processor (DSP) 502 and a memory 504. As shown, the mobile device 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the mobile device 400 may include another kind of display that does not provide a touch sensitive screen. In an embodiment, the DSP 502 may communicate directly with the memory 504 without passing through the input/output interface 518. Additionally, in an embodiment, the mobile device 400 may comprise other peripheral devices that provide other functionality.

The DSP 502 or some other form of controller or central processing unit operates to control the various components of the mobile device 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 400 to function as a peripheral device to exchange information with a personal computer or other computer system. The infrared port 524 and other optional ports such as a Bluetooth® interface or an IEEE 802.11 compliant wireless interface may enable the mobile device 400 to communicate wirelessly with other nearby handsets and/or wireless base stations.

The keypad 528 couples to the DSP 502 via the interface 518 to provide one mechanism for the user to make selections, enter information, and otherwise provide input to the mobile device 400. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the mobile device 400 to determine its position.

Figure 6A:
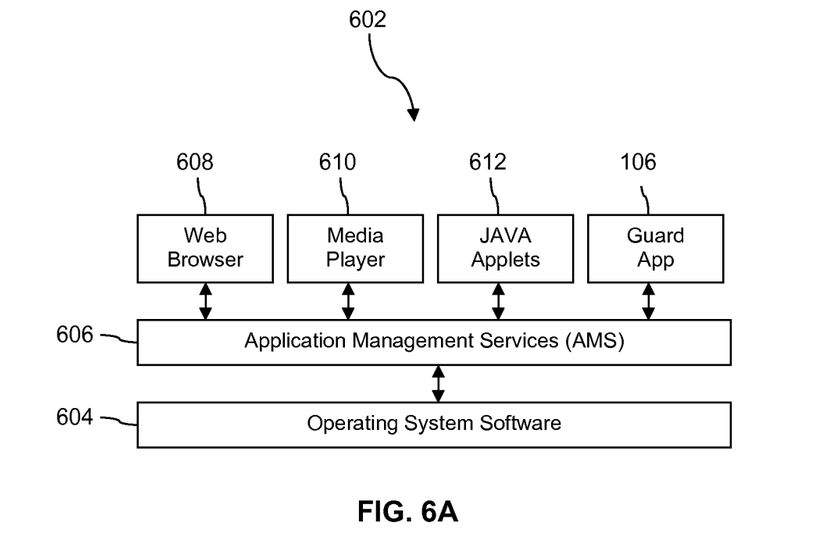
FIG. 6A is a block diagram of a software architecture of a mobile communication device according to an embodiment of the disclosure.

FIG. 6A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 400. Also shown in FIG. 6A are a web browser application 608, a media player application 610, and JAVA applets 612. The web browser application 608 may be executed by the mobile device 400 to browse content and/or the Internet, for example when the mobile device 400 is coupled to a network via a wireless link. The web browser application 608 may permit a user to enter information into forms and select links to retrieve and view web pages. The media player application 610 may be executed by the mobile device 400 to play audio or audiovisual media. The JAVA applets 612 may be executed by the mobile device 400 to provide a variety of functionality including games, utilities, and other functionality.

Figure 6B:
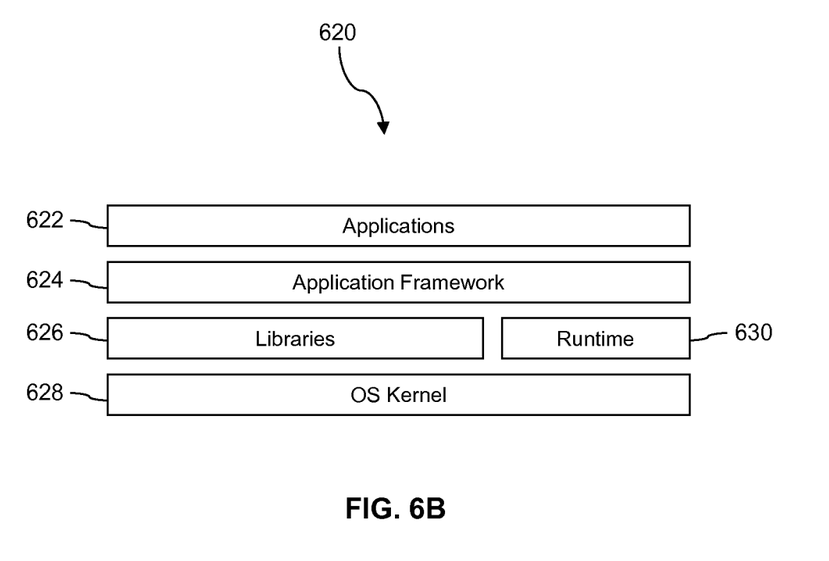
FIG. 6B is a block diagram of another software architecture of a mobile communication device according to an embodiment of the disclosure.

FIG. 6B illustrates an alternative software environment 620 that may be implemented by the DSP 502. The DSP 502 executes operating system software 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 7:
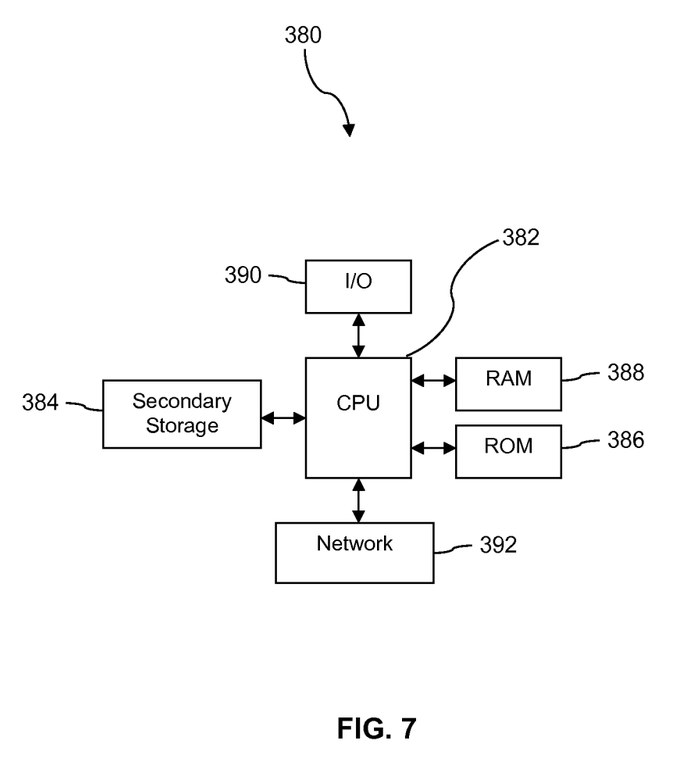
FIG. 7 is a block diagram of a computer system according to an embodiment of the disclosure.

FIG. 7 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A mobile device for directing customer service calls from mobile service users, comprising:
   an interface of the mobile device configured to receive an input, wherein the input is a shortcut correlated to a customer service center telephone number of a mobile service provider, and wherein the shortcut is configured to contact a customer service center associated with the customer service center telephone number;
   a memory of the mobile device;
   a processor of the mobile device; and
   an application stored in the memory of the mobile device that, when executed by the processor of the mobile device:
      determines a parameter of the mobile device in response to the input;
      identifies a different mobile service provider correlated with the parameter;
      verifies the parameter associated with the different mobile service provider; and
      reroutes a communication from the mobile device to a different customer service center of the different mobile service provider correlated with the device parameter instead of the customer service center of the mobile service provider, wherein the rerouting comprises utilizing the input that is associated with the mobile service provider to access a telecommunications network from the different mobile service provider.

2. The mobile device of claim 1, wherein the mobile device comprises a mobile phone, a personal digital assistant, a wireless enabled computer, or a media player.

3. The mobile device of claim 1, wherein the device parameter comprises a device operator identifier (DOI) or network access identifier (NAI).

4. The mobile device of claim 1, wherein determining a parameter of the device further comprises locating the device parameter on the device and the device parameter in view of the user input, the factory device settings, and the telecommunications network.

5. A method of routing a telecommunication to a service provider, comprising:
   receiving, by a routing module stored in a non-transitory memory of a mobile device and executable by a processor of the mobile device, an input, wherein the input is a shortcut correlated to a service provider, and wherein the shortcut is configured to contact a customer service center associated with the service provider;
   determining, by the routing module, a parameter of the mobile device in response to the input;
   identifying, by the routing module, a different service provider according to the parameter;
   querying, by the routing module, a mobile telecommunications network correlated with the different service provider;
   verifying, by the routing module, the device parameter with the mobile telecommunications network; and
   rerouting, by the routing module, a communication from the mobile device to a different customer service center of the different service provider instead of the customer service center of the service provider, wherein the rerouting comprises utilizing the input that is associated with the service provider to access the mobile telecommunications network from the different service provider.

6. The method of claim 5, wherein the mobile device comprises a mobile phone, a personal digital assistant, a wireless enabled computer, or a media player.

7. The method of claim 5, wherein querying the mobile telecommunications network comprises establishing a communications link to the mobile telecommunications network according to a code division multiple access (CDMA) wireless communication protocol, a global system for mobile communication (GSM) wireless communication protocol, a long-term evolution (LTE) wireless communication protocol, or a world-wide interoperability for microwave access (WiMAX) wireless communication protocol.

8. The method of claim 5, wherein the device parameter comprises a device operator identifier (DOI) or network access identifier (NAI).

9. The method of claim 5, wherein verifying the device parameter further comprises updating the device parameter to correlate the input with network parameters and access authorization of the different service provider.

10. A method of reprovisioning a mobile device, comprising:
    receiving, by a routing module stored in a non-transitory memory of a mobile device and executable by a processor of the mobile device, an input, wherein the input is a shortcut to contact a customer service center associated a mobile service provider;
    accessing, by the routing module, parameters of the mobile device in response to the input;
    determining, by the routing module, a communications network of a different mobile service provider from the parameters of the mobile device;
    accessing, by the routing module, the communications network to verify and update the parameters;
    caching, by the routing module, the updated mobile device parameters in the non-transitory memory of the mobile device to reprovision the mobile device; and
    rerouting a communication from the mobile device to a different customer service center of the different mobile service provider instead of the customer service center of the mobile service provider, wherein the rerouting comprises utilizing the input that is associated with the mobile service provider to access the communications network from the different mobile service provider.

11. The method of claim 10, wherein the rerouting occurs after the caching.

12. The method of claim 10, wherein the mobile device comprises a mobile phone, a personal digital assistant, a wireless enabled computer, or a media player.

13. The method of claim 10, wherein the device parameter is comprises a device operator identifier (DOI) or network access identifier (NAI).

14. The method of claim 10, wherein the shortcut comprises a quick-code, a star-code, a shortcut-code, or a vertical service code.

15. The method of claim 10, wherein accessing parameters of the mobile device further comprises identifying whether there are parameters installed on the mobile device.

16. The method of claim 10 wherein determining the communications network from the parameters of the mobile device further comprises altering a correlation between the input, the parameters, and the communications network.

* * * * *